United States Patent [19]
Seffernick

[11] Patent Number: 6,121,954
[45] Date of Patent: Sep. 19, 2000

[54] UNIFIED BODIED Z-AXIS SENSING POINTING STICK

[75] Inventor: Lewis L. Seffernick, Decatur, Ind.

[73] Assignee: CTS Corporation

[21] Appl. No.: 08/938,274

[22] Filed: Sep. 26, 1997

[51] Int. Cl.[7] ................................................. G09G 5/08
[52] U.S. Cl. ............................................................ 345/161
[58] Field of Search ..................................... 345/161, 168, 345/169; 273/148, 149; 200/5, 6 R; 74/471, 472, 473

[56] References Cited

U.S. PATENT DOCUMENTS

| | | |
|---|---|---|
| Re. 35,016 | 8/1995 | Gullman et al. . |
| 4,680,577 | 7/1987 | Straayer et al. . |
| 4,876,524 | 10/1989 | Jenkins . |
| 4,905,523 | 3/1990 | Okada . |
| 4,967,605 | 11/1990 | Okada . |
| 4,969,366 | 11/1990 | Okada . |
| 5,034,574 | 7/1991 | Martovitz ................................ 340/709 |
| 5,263,375 | 11/1993 | Okada . |
| 5,325,081 | 6/1994 | Roberts . |
| 5,407,285 | 4/1995 | Franz . |
| 5,473,347 | 12/1995 | Collas et al. . |
| 5,489,900 | 2/1996 | Cali et al. . |
| 5,521,596 | 5/1996 | Selker et al. . |
| 5,701,142 | 12/1997 | Brown et al. ............................ 345/168 |
| 5,754,167 | 5/1998 | Narusawa et al. ....................... 345/161 |
| 5,835,977 | 11/1998 | Kamentser et al. .................. 73/862.05 |
| 5,872,320 | 2/1999 | Kamentser et al. ............... 73/862.044 |
| 5,889,507 | 3/1999 | Engle et al. ............................. 345/161 |
| 5,894,301 | 4/1999 | Seffernick ............................... 345/160 |

Primary Examiner—Richard A. Hjerpe
Assistant Examiner—Ronald Laneau
Attorney, Agent, or Firm—Mark P. Bourgeois; Mark W. Borgman

[57] ABSTRACT

A pointing stick 10 for controlling the positioning, movement and operation of a cursor 209 on the display screen 213. The pointing stick 10 includes a solid structure 20 having a base 24 and a shaft 22 integrally formed with and perpendicular to the base. A film 30 is mounted on the base and a sensor 32 is mounted on the film. The sensor is capable of sensing strains on the base that are indicative of the direction that the shaft is being forced. The sensor functions by using strain sensitive resistors that change resistance based upon the amount of strain that they are subject to. The strain sensitive resistors are coupled to circuitry that will produce signals in response to the strain on the gages. The resulting signals are used to either control the movement of the cursor around the display screen, or to do what is commonly called "clicking" a mouse button for selection of items or dragging of items on the display screen. A cavity 26 may be placed on the base and located circumferentially around the shaft. The recessed area or cavity area may be more flexible than the remaining base structure and typically the film having a sensor mounted thereon may be bonded to the side of the base opposite the cavity. The pointing stick may be used on a keyboard having a home-row of keys locating fingers of a user during typing. The pointing stick can be used to select an item on a display screen or move a cursor or similar object on the display screen using only one finger of one hand. During this time the remaining fingers of both hands may reside inactive on the home-row of keys.

9 Claims, 4 Drawing Sheets

UNIFIED BODIED Z-AXIS SENSING POINTING STICK

This application is related to co-pending U.S. application Ser. No. 08/756,202, entitled Z-Axis Sensing Pointing Stick with Base as Strain Concentrator, filed Nov. 25, 1996, co-pending U.S. application Ser. No. 08/717,517, entitled Collar Mounted Pointing Stick, filed Sep. 23, 1996, and co-pending U.S. application docket number CTS 1562, entitled Z-Axis Pointing Stick with ESD Protection, filed Feb. 4, 1997. All applications being assigned to the current assignee of this application are herein incorporated by reference in their entirety.

BACKGROUND OF THE PREFERRED EMBODIMENT(S)

1. Field of the Preferred Embodiments(s)

This invention generally relates to a pointing device for controlling the positioning, movement and operation of a cursor on a display screen. Specifically, there is a pointing stick that both directs a cursor and acts as the activation button for selecting items on the display screen by tapping on the pointing stick instead of clicking on a mouse button.

2. Description of the Related Art

Various devices are well known for controlling cursor movement over a computer display screen of a computer and for signaling a choice of computer command identified by the position of the cursor on the display screen menu. One such device is a "mouse" which has a ball on its underside rolled over a horizontal surface, with the x- and y-axis components of movement being sensed and transmitted through a connecting cable to a serial input port of the computer. The signal to the computer is varied by the amount and direction of movement of the mouse ball, and causes the cursor on the display screen to have a corresponding movement. One or two "mouse" or "click" buttons located on the top of the mouse at the forward end permit the computer operator to enter a selection or other command to the computer (the command typically being shown by the position of the cursor on a displayed menu) upon pressing one or the other or both buttons, depending upon the software associated with the device. A "mouse" device is typically separated from the computer console and keyboard and requires a connection to a computer port. Additionally, the "mouse" requires a flat, horizontal surface, and for operation, the computer operator must completely remove one hand from the computer keyboard.

Another cursor controlling and signaling mechanism is a "joystick" which like the mouse is completely separated from the computer console and keyboard. The joystick is typically an elongated stick that extends upwardly from a base connected to the computer console by means of a cable. The joystick is operated by tilting the upstanding stick in various directions to cause the cursor or other display element to move in a direction and usually at a speed corresponding to the direction and pressure exerted on the stick by the computer operator. The operation of a joystick, however, frequently requires that both hands be removed from the computer keyboard, one hand to hold the base while the other manipulates the joystick. A "click" button is usually located on the joystick. Although a mouse or a joystick can be used with a portable "laptop" or "notebook" size computers, such devices are cumbersome, must be carried separately and connected to the computer before use, and are not suitable for operation during travel.

Still, another type of cursor controlling device is a "trackball." This device, which in essence is an inverted mouse, includes a rotatable ball mounted within a housing. The ball is rotated by a finger, thumb or palm of the computer operator, and the x- and y-components of movement are sensed and input into the computer to cause corresponding movement of the cursor across the display screen. "Mouse" or "click" buttons are usually located on the trackball housing, although with some models the selection signal is input by pressing the "enter" key on the standard keyboard. This type of pointing device has been found useful with portable computers because it can be temporarily affixed to one side of the computer case for manipulation by one hand of the computer operator. However, although trackball devices can be removably attached to the computer case, they still require attachment before use and removal after use. It is also noted that some trackballs are built into the computer keyboard. Nonetheless, these trackballs require a separate set of "click" buttons for selection of items on the display monitor.

Manufacturers of portable laptop computers, recognizing the need for placing the cursor controlling device in a permanent and more convenient location, installed a small stubby, button-like joystick centrally around the keys of the computer keyboard, specifically at the juncture of the "g," "h" and "b" keys of the standard "QWERTY" keyboard. The joystick, also known as a pointing stick, was sensitive to lateral pressure, the amount and direction of which were sensed and input into the computer to cause movement of the cursor, and the speed and direction of cursor movement corresponded to the amount and direction of pressure on the joystick. However, the manufacturer has to provide upwardly extending "mouse" or "click" buttons somewhere on the computer.

Despite the advantages of each type of cursor control, none have allowed the user to both control the cursor movement and select items on the display using exclusively a pointing stick device. Additionally, no prior art allows the user this dual control by using only one finger while allowing the remaining fingers to reside on the home row of the standard keyboard.

DESCRIPTION OF RELATED ART

Examples of patents related to the present invention are as follows, wherein each patent is herein incorporated by reference for related and supporting teachings:

U.S. Pat. No. Re. 35,016, is a three-axis force measurement stylus.

U.S. Pat. No. 5,521,596, is a sensor device placed either underneath a key cap or a key on a keyboard or between two keys on a keyboard so that cursor movement may be carried out from the keyboard itself.

U.S. Pat. No. 5,489,900, is a force sensitive transducer for use in a computer keyboard.

U.S. Pat. No. 5,473,347, is a computer pointing device for controlling the positioning, movement and operation of a cursor on the display screen of a computer.

U.S. Pat. No. 5,407,285, is an apparatus for use in a computer keyboard for cursor control is disclosed.

U.S. Pat. No. 5,325,081, is a supported strain gauge and joy stick assembly and method of making.

U.S. Pat. No. 5,263,375, is a contact detector using resistance elements and its application.

U.S. Pat. No. 4,969,366, is a moment detector using resistance elements.

U.S. Pat. No. 4,967,605, is a detector for force and acceleration using resistance elements.

U.S. Pat. No. 4,905,523, is a force detector and moment detector using resistance elements.

U.S. Pat. No. 4,876,524, is an isometric control device or the like of the type having an elastic beam and strain gauges attached to the surface of the beam characterized by at least a first group of three strain gages each having an operative axis thereof inclined with a single predetermined angle with respect to the main axis of the beam, and the strain gauges disposed at a first predetermined level along the beam.

U.S. Pat. No. 4,680,577, is a multipurpose key switch for controlling cursor movement on a CRT display and for character entry includes a key cap that moves laterally to provide cursor control and that moves vertically for character entry.

The foregoing patents reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, applicants' claimed invention.

SUMMARY OF THE PREFERRED EMBODIMENT(S)

It is a feature of the invention to provide a pointing stick for controlling the positioning, movement and operation of a cursor on the display screen.

A further feature of the invention is to provide a pointing stick assembly using a solid structure having a base and a shaft integrally formed with and perpendicular to the base. A film is mounted on the base and a sensor is mounted on the film. The sensor is capable of sensing strains on the base that are indicative of the direction that the shaft is being forced. The sensor functions by using strain sensitive resistors that change resistance based upon the amount of strain that they are subject to.

The strain gages are coupled to circuitry that will produce signals in response to the strain on the gages. The resulting signals are used to either control the movement of the cursor around the display screen, or to do what is commonly called "clicking" a mouse button for selection of items or dragging of items on the display screen.

Another feature of the invention is to provide a pointing stick that may have a recessed area or cavity on the base and is located circumferentially around the shaft. The recessed area or cavity area may be more flexible than the remaining base structure and typically the film having a sensor mounted thereon may be bonded to the side of the base opposite the cavity.

A further feature of the invention is to provide a keyboard having a home-row of keys locating fingers of a user during typing. The keyboard has a control device that can be used to select an item on a display screen or move a cursor or similar object on the display screen using only one finger of one hand. During this time the remaining fingers of both hands may reside inactive on the home-row of keys.

The invention resides not in any one of these features per se, but rather in the particular combination of all of them herein disclosed and claimed and it is distinguished from the prior art in this combination of all of its structures for the functions specified.

There has thus been outlined, rather broadly, the more important features of the invention so that the detailed description thereof that follows may be better understood, and so that the present contribution to the art may be better appreciated. There are, of course, additional features of the invention that will be described hereinafter which will form the subject matter of the appended claims. Those skilled in the art will appreciate that the preferred embodiment may readily be used as a basis for designing other structures, methods and systems for carrying out the several purposes of the present invention. It is important, therefore, that the claims are regarded as including such equivalent constructions since they do not depart from the spirit and scope of the present invention.

Further, the purpose of the abstract is to enable the public generally, and especially the scientists, engineers and practitioners in the art who are not familiar with patent or legal terms or phraseology, to find out quickly from a cursory inspection the nature and essence of the technical disclosure of the application. The abstract is neither intended to define the invention of the application, which is measured by the claims, neither is it intended to be limiting as to the scope of the invention in any way.

BRIEF DESCRIPTION OF THE DRAWINGS

These and other features of the invention can best be understood by the following description of the accompanying drawings as follows.

Figure 1:
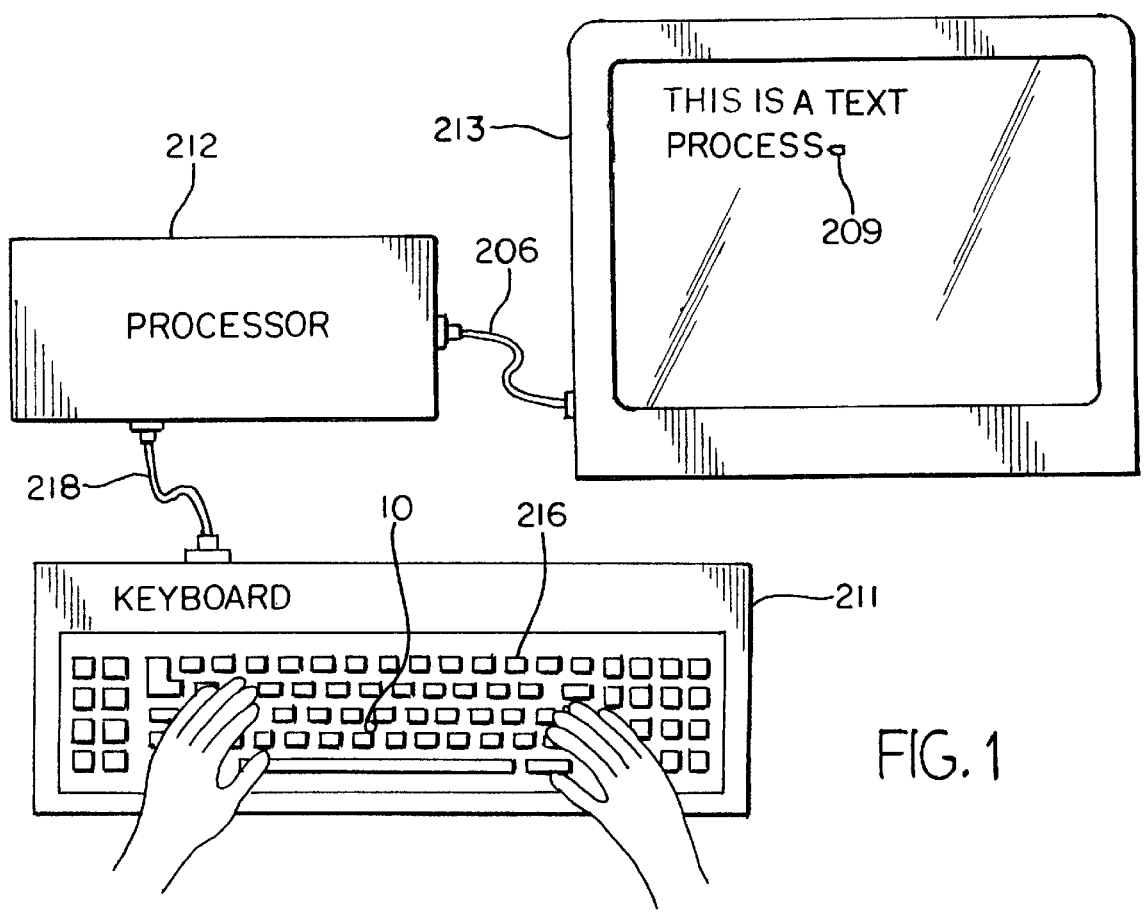
FIG. 1 is an illustration of the pointing stick as used on a keyboard operated computer system.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings. In the drawings, like numbering represents like elements in the drawings.

DETAILED DESCRIPTION OF THE PREFERRED EMBODIMENT

Referring to FIG. 1, there is shown a keyboard operated computer system. The system includes a keyboard 211 implemented by this invention and connected to a computer 212. The data entry from the keyboard 211 is displayed on a computer display or monitor 213 during the normal course of operation of an application program. The keyboard has a layout of keys 216 that is an industry standard. The keyboard is shown to have an output cable 218 coupled to the computer 212. The computer is coupled to the monitor via connecting cable 206. A cursor 209 is displayed on the computer monitor 213. A pointing stick 10 that can be used to control cursor 209 and select items on computer display 213 is located in the middle of the keyboard 211.

Figure 2:
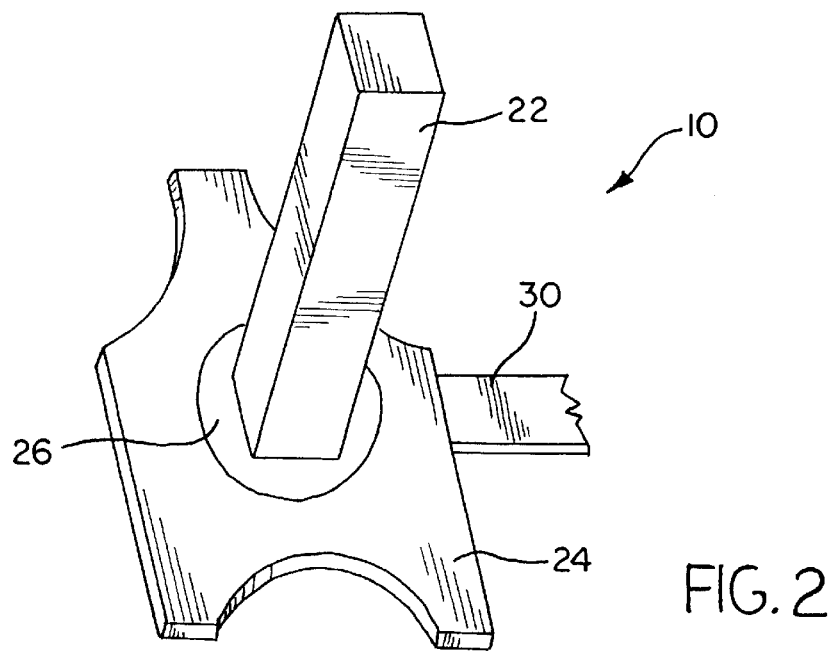
FIG. 2 is a perspective view of a preferred embodiment of the pointing stick.
Figure 3:
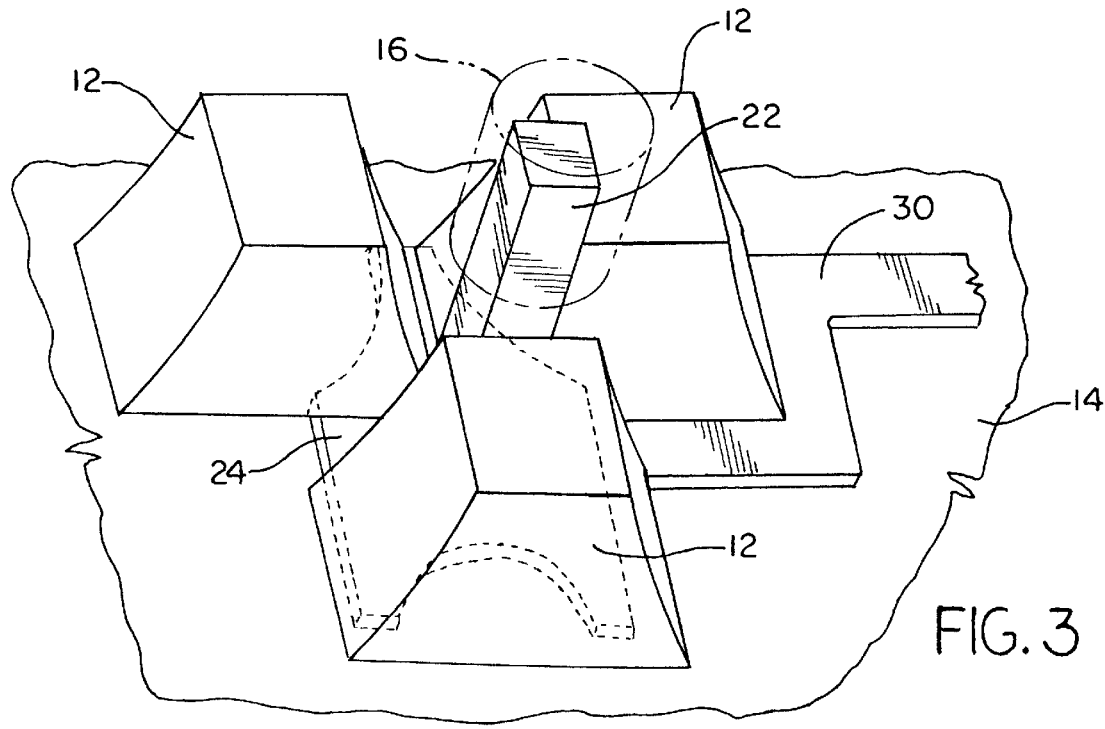
FIG. 3 is a perspective view of the pointing stick in FIG. 2 as placed between keys of a keyboard.
Figure 4:
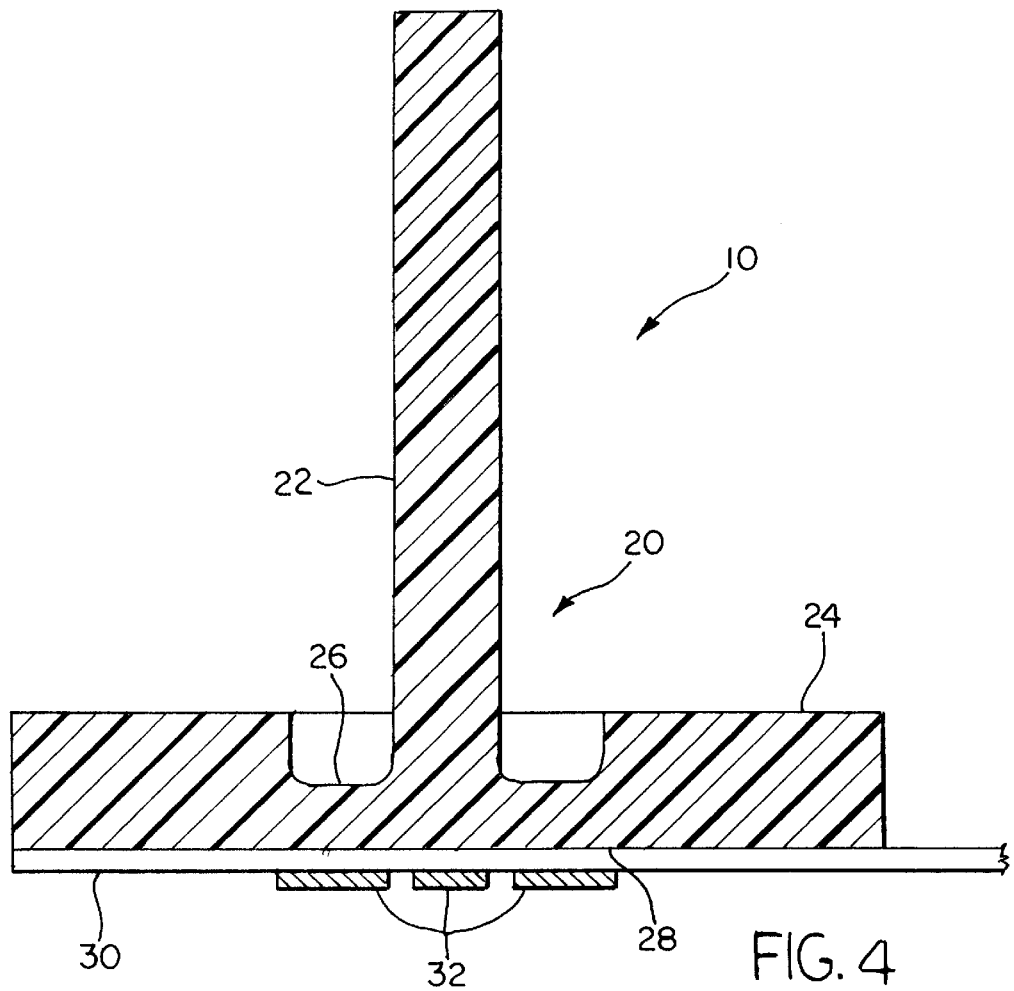
FIG. 4 is a cross-sectional view of FIG. 2

Referring to FIGS. 2, 3, and 4, the pointing stick 10 includes a solid unified structure 20 that may be molded from plastic or resin material. Structure 20 includes has a stick 22 (or shaft), a base 24 for supporting the stick 22, and a cavity 26 (or reduced section) formed in the base 24. The cavity 26 allows the bottom side 28 of base 24 to flex when pressure is applied to stick 22.

The pointing stick 10 is typically positioned on the supporting base 24 and between the B, G and H keys 12 of a typing keyboard. Pointing stick 10 has a rubber-like cap 16 positioned over the top of stick 22 to increase the ease of operation. The cap is designed to have sufficient friction to enable the operator to control the cursor with a single finger positioned on top of it and pushing in desired cursor direction.

Attached to the bottom side 28 is a film 30 (or cable). Typically, the film 30 may be made of polyimide material. Film 30 may be adhesively bonded to the bottom side 38 of base 24 using epoxy or any other suitable technique. Strain sensitive resistors 32 are deposited on the film 30. The resistors 32 can be deposited using any conventional thick or thin film technique. The finger pressure exerted on stick 22 causes strain in resistors 32 when base 24 flexes. The strain causes the resistance of resistors 32 to vary, and this change is detected in circuitry (not shown) and used to control the cursor or make selections.

Figure 5:
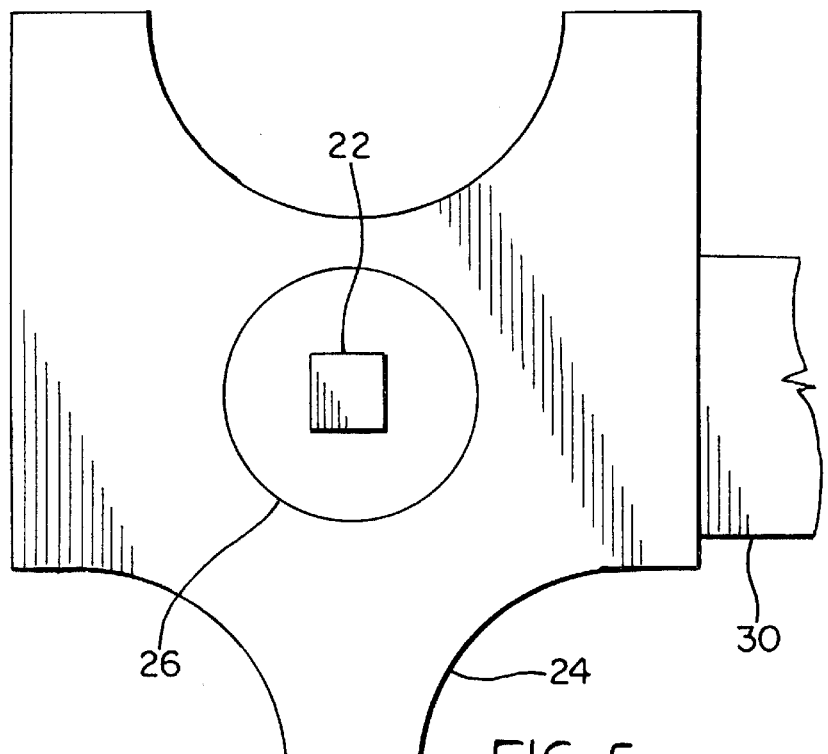
FIG. 5 is a top view of the pointing stick.
Figure 6:
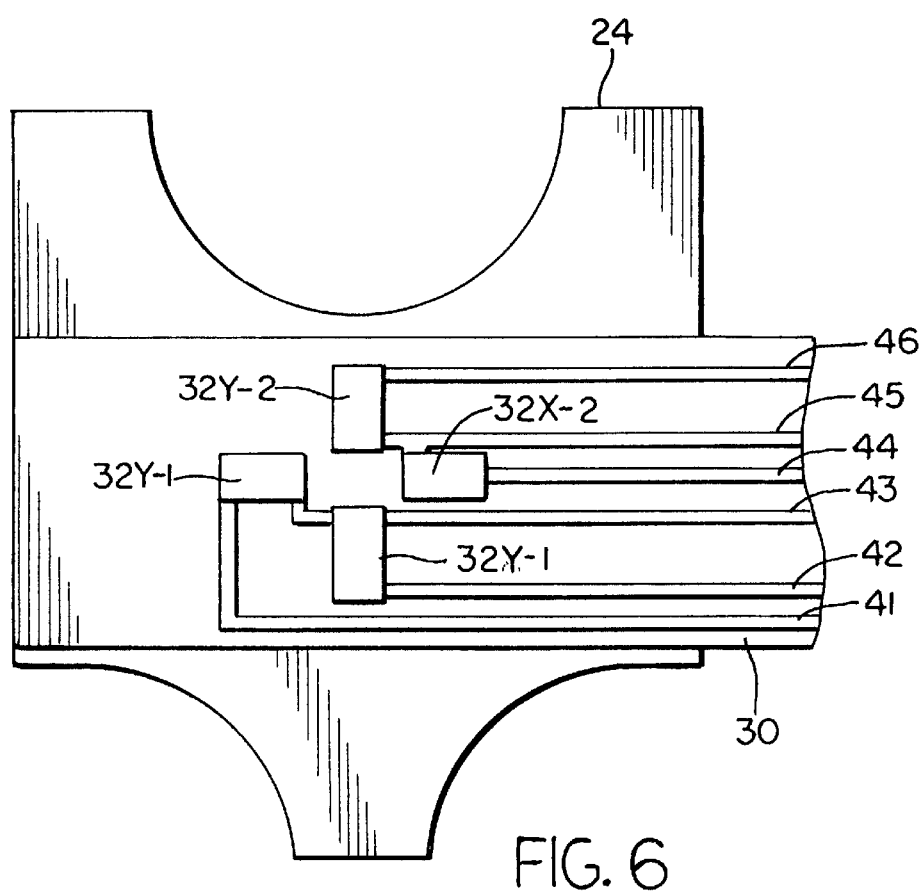
FIG. 6 is a bottom view of the pointing stick.

Referring to FIGS. 5 and 6, four resistors 32 spaced around the cavity 26 such that there is one resistor on each side of the stick 22 along the x and y axes (i.e. 32 X-1, 32 X-2, 32 Y-1 and 32 Y-2). Also deposited on film 30 are electrically conductive traces 41, 42, 43, 44, 45, and 46. Each resistor 32 has two traces electrically connected to it, and conductive traces 43 and 45 are each electrically connected to two resistors. Conductive trace 43 is electrically connected to resistors 32 X-2 and 32 Y-2, and conductive trace 45 is electrically connected resistors 32 X-1 and 32 Y-1.

Figure 7:
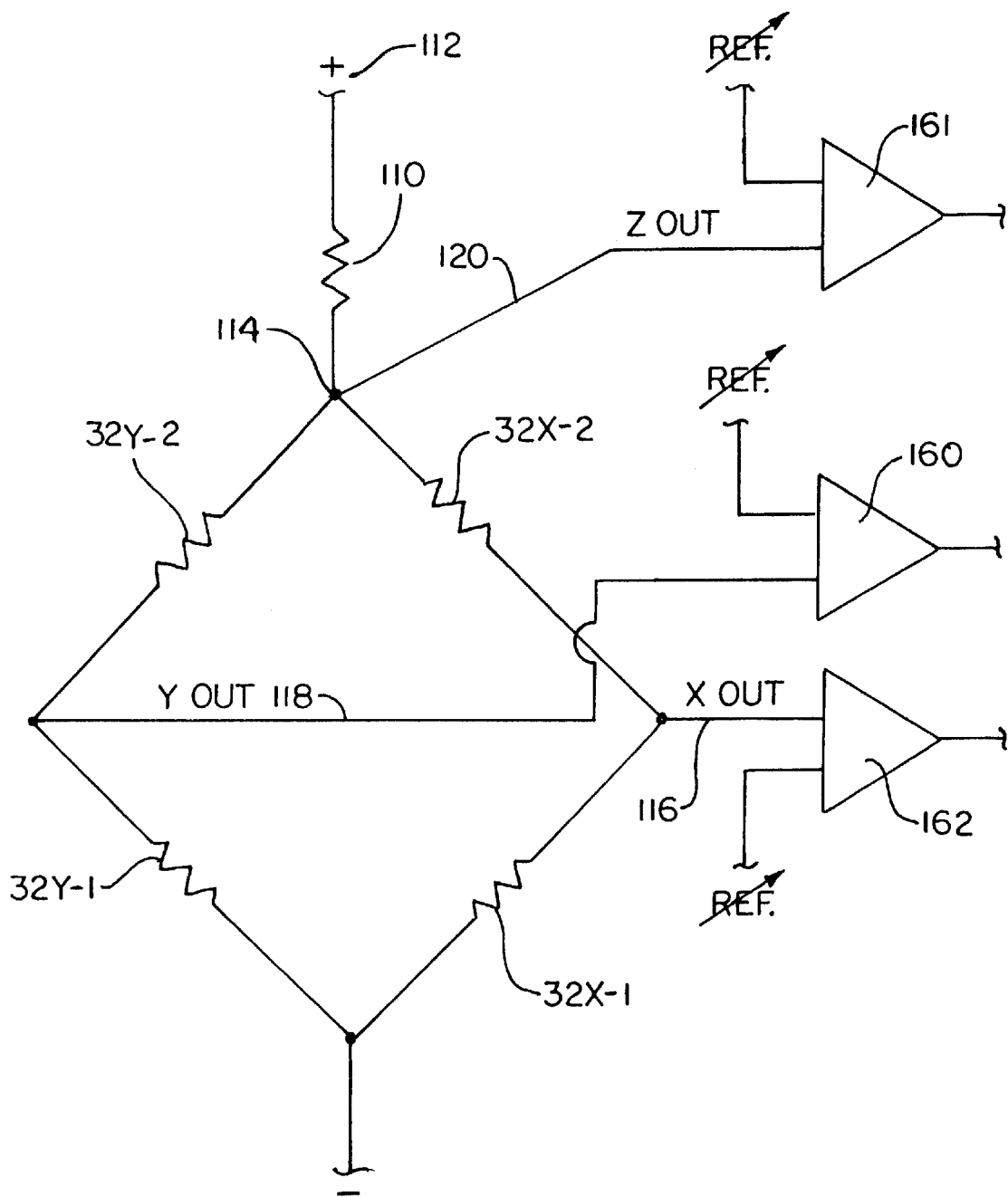
FIG. 7 is an electrical schematic of a bridge circuit incorporating the strain sensitive elements.

In reference to FIG. 7, there is an electrical schematic of a bridge circuit incorporating the strain sensitive elements. Specifically, this circuit is an example of how the z-axis pointing stick can be arranged to interface with the electronics (not shown). The strain sensitive resistors 32 and conductive traces 41, 42, 43, 44, 45, and 46 on polyimide film 30 are configured in two half bridge circuits, resistors 32 Y-1 and 32 Y-2 form a first half bridge, and resistors 32 X-1 and 32 X-2 form the second half bridge. A fixed resistor 110 is connected between a voltage supply 112 of the system and node 114. The X, Y, and Z OUT outputs, 116, 118, and 120 respectively, are amplified by the three differential amplifiers 160, 161, and 162. Each amplifier has a variable reference voltage input. These reference voltages are calibrated to set the output to zero when no force is applied to the stick 12. The X and Y axis outputs 116 and 118 are developed when an X or Y directional force is applied to the stick 12. For example, when a force is applied in the X direction, the X-1 and X-2 strain sensitive resistors change resistance in opposite directions and cause an output change. The same is true for the Y-axis. A Z-axis output is developed when a Z-axis force is applied to the top of the stick 12. Force in the Z-axis causes all resistors 32 on the stick 12 to change in a positive direction. This change raises the total impedance of the two half bridges. The higher bridge impedance causes a voltage change in the Z output 120 since the series resistor 110 is fixed.

Remarks About the Preferred Embodiment

One of ordinary skill in the arts of strain gages, and more particularly the art of designing pointing sticks with strain gages, will realize many advantages from using the preferred embodiment. In particular, strain gages are devices that sense the amount of applied pressure placed upon the pointing stick. The sensed pressure creates electrical output signals used to direct the cursor on a display device. The present invention enables control of both the directions of the cursor movement and the selection of items on the display device by tapping the pointing stick like the clicking of a mouse button. Of course, a skilled artisan will realize that the base 24 may have some flexure in a downward direction during the application of tapping force. The size of the cavity around the stick has an effect on the amount of flexure of the base 24.

Additionally, a skilled artisan will understand that the strain gages may be made of thick films piezo-resistive material, which are applied using known screen techniques.

It is further noted that a skilled artisan would realize that the pointing stick 10 is capable of now performing selection and dragging of icons on a monitor in addition to double clicking for selection of an item. In this operation, the user would hold down the pointing stick 10 while exerting additional force in the X-Y plane for controlling the direction of the icon being dragged. All of these functions are now capable of being performed with a single finger while the remaining fingers are inactively located on a home-row of the keyboard. The home-row being the keys marked "a, s, d, f, j, k, l, and ;" as typically referred to in typing manuals.

Variations of the Preferred Embodiment(s)

One of ordinary skill in the art of making pointing sticks will realize that there are many different ways of accomplishing the preferred embodiment. For example, although it is contemplated to make the solid structure 20 out of plastic or epoxy resin material, any suitable material would work, like ceramic or metals etc. Further altering the material could effect the stiffness of the structure; therefore material changes could be used to adjust the sensitivity of the device. The sensitivity of the device can also be altered by changing the size, shape or location of cavity 26, stick 22, and base 24. For example, the stick 22 could be made round or its thickness could be varied. The solid structure 20 could also be manufactured with methods other than molding, such as machining, forging, or casting.

In addition, although it is illustrated that the cavity 26 be placed on the top side of the base 24, it is equally contemplated to place the cavity on the bottom side of the base. In fact a cavity need not exist at all if the base section is thin enough to provide sufficient strain in resistors 32 as force is applied to the stick 22. Of course, the location of resistors 32 could also be varied and placed on the topside of base 24 for instance. This would require a hole placed in the film that would fit around the stick.

Another possible variation is to print the strain gage resistors 32 on a material like an FR4 board and strain concentrators could be either bonded or machined into the board. Furthermore, even though, the embodiment discusses the use of four strain gage resistors (i.e. one along each of the x-1, x-2, y-1, and Y-2 axes), it is contemplated to use only two resistors for sensing only either the positive or negative strain on the bending of the stick for creating the resulting control signals. It is also contemplated to use more than four strain gage resistors. The resistors could be placed between the resistors depicted in the preferred embodiment or extended out along the x and y to provide more inputs.

Similarly, even though the embodiment discusses the use of a cursor on a monitor, one skilled in the computer arts would realize that any item that can be moved around by the typical mouse may be controlled by the preferred embodiment. For example, pointing arrows, icon selection items, air planes, boats, cats, pictures of atoms, all could have their movements controlled.

Additionally, even though the illustrated embodiment shows the stick and base as part of a singularly molded piece, it is contemplated to make the stick and base separately and extend the stick into the base or attach it thereto.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A device for controlling the movement of an object on a display screen, comprising:
    a) a base having an upper surface and a lower surface;
    b) a shaft integrally formed with and substantially perpendicular to the base;
    c) a cavity formed in the upper surface and located circumferentially around the shaft, the cavity allowing bending of the base;
    d) a film mounted on the lower surface;
    e) a plurality of strain sensitive resistors, mounted on the film and located below the cavity, for sensing strain on the base indicative of the direction that the shaft is being forced, the cavity allowing bending of the base and concentrating the bending onto the strain sensitive resistors, the bending of the base further providing a tactile feedback to a user; and
    f) a plurality of conductive traces, mounted to the film and electrically connected to the resistors.

2. The device of claim 1, wherein the plurality of resistors comprise:
    four resistors connected in a bridge configuration.

3. The device of claim 2, wherein application of force to the shaft in a direction parallel to the shaft causes the impedance of the bridge to increase.

4. The device of claim 3, wherein the device is mounted in a keyboard.

5. The device of claim 1, further comprising:
    a bonding material located between opposing surfaces of the base and the film for securely bonding the film to the base.

6. A pointing and selection device for mounting in a keyboard comprising:
    a) a home-row of keys located on the keyboard for locating fingers of a user during typing;
    b) a) a base, mounted to the keyboard and having an upper surface and a lower surface;
    c) a shaft integrally formed with and substantially perpendicular to the base;
    d) a cavity formed in the upper surface and located circumferentially around the shaft, the cavity allowing bending of the base;
    e) a film mounted on the lower surface;
    f) a plurality of strain sensitive resistors, mounted on the film and located below the cavity, for sensing strain on the base indicative of the direction that the shaft is being forced, the cavity allowing bending of the base and concentrating the bending onto the strain sensitive resistors, the bending of the base providing a tactile feedback to a user;
    g) a plurality of conductive traces, mounted to the film and electrically connected to the resistors; and
    h) the device allowing the user to both select an item on a display device and control the movement of a cursor on the display device by using a single finger of one hand on the shaft, while the remaining fingers of both hands reside inactive on the home-row.

7. The device of claim 6, wherein the plurality of resistors comprises:
    four resistors connected in a bridge configuration.

8. The device of claim 7, wherein application of force to the shaft in a direction parallel to the shaft causes the impedance of the bridge to increase.

9. The device of claim 6, further comprising:
    a bonding material located between opposing surfaces of the base and the film for securely bonding the film to the base.

\* \* \* \* \*